(12) United States Patent
Dighton

(10) Patent No.: US 12,477,986 B2
(45) Date of Patent: Nov. 25, 2025

(54) RADAR BASED CUTTING HEIGHT SYSTEM FOR A SUGARCANE HARVESTER

(71) Applicant: DEERE & COMPANY, Moline, IL (US)

(72) Inventor: John A. Dighton, Napoleonville, LA (US)

(73) Assignee: Deere & Company, Moline, IL (US)

( * ) Notice: Subject to any disclaimer, the term of this patent is extended or adjusted under 35 U.S.C. 154(b) by 763 days.

(21) Appl. No.: 17/863,618

(22) Filed: Jul. 13, 2022

(65) Prior Publication Data

US 2024/0016093 A1    Jan. 18, 2024

(51) Int. Cl.
*A01D 45/10*     (2006.01)
*A01B 63/00*     (2006.01)
*G06V 20/10*     (2022.01)

(52) U.S. Cl.
CPC .......... *A01D 45/10* (2013.01); *A01B 63/008* (2013.01); *G06V 20/188* (2022.01)

(58) Field of Classification Search
CPC ...... A01D 45/10; A01D 91/00; A01B 63/008; G06V 20/188
See application file for complete search history.

(56) References Cited

U.S. PATENT DOCUMENTS

| | | |
|---|---|---|
| 4,507,910 A | 4/1985 | Thornley et al. |
| 6,791,488 B2 | 9/2004 | Diekhans et al. |
| 7,401,455 B1 | 7/2008 | Cleodolphi |
| 8,452,501 B1 | 5/2013 | Lange et al. |
| 10,058,028 B2 | 8/2018 | Richard et al. |
| 10,371,561 B2 | 8/2019 | Darr et al. |

(Continued)

FOREIGN PATENT DOCUMENTS

| | | | | |
|---|---|---|---|---|
| CN | 110352707 A | * | 10/2019 | ............ A01D 45/10 |
| CN | 210130137 U | * | 3/2020 | ............ A01D 45/10 |

(Continued)

OTHER PUBLICATIONS

Liang Zhao et. al., Ground surface detection method using ground penetrating radar signal for sugarcane harvester base-cutter control, Research Paper-Biosystems Engineering, May 15, 2022, pp. 1-7 [online]. Retrieved from the Internet <URL: https://doi.org/10.1016/j.biosystemseng.2022.04.024>.

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A sugarcane harvester for harvesting sugarcane including a cutting blade to cut sugarcane. The cutting blade is adjustably supported by the sugarcane harvester to cut the sugarcane at a desired height. A radar assembly is coupled to the sugarcane harvester and transmits electromagnetic waves toward a ground surface, wherein reflected electromagnetic waves identify a ground level of the ground surface which is used to adjust a height of the cutting blade with respect to the ground surface. A controller is operatively connected to the radar assembly and to the cutting blade. The controller is adapted to receive the ground level identified by the radar assembly and adjusts a position of the cutting blade with respect to the ground surface based on the identified ground level.

20 Claims, 6 Drawing Sheets

(56) References Cited

U.S. PATENT DOCUMENTS

| | | | |
|---|---|---|---|
| 10,827,676 B2 * | 11/2020 | Dighton | G06V 20/188 |
| 11,483,972 B2 * | 11/2022 | Dima | A01B 63/008 |
| 11,744,180 B2 * | 9/2023 | Gunda | A01B 79/005 |
| | | | 56/10.2 A |
| 11,963,480 B2 * | 4/2024 | Martin | A01D 75/287 |
| 12,102,025 B2 * | 10/2024 | Schroeder | A01B 79/005 |
| 12,232,448 B2 * | 2/2025 | Lucca | A01D 43/085 |
| 2003/0000193 A1 | 1/2003 | Beck et al. | |
| 2003/0019196 A1 * | 1/2003 | Coers | A01D 41/127 |
| | | | 56/10.2 G |
| 2003/0184747 A1 | 10/2003 | Diekhans et al. | |
| 2004/0006958 A1 | 1/2004 | Thiemann et al. | |
| 2017/0064904 A1 * | 3/2017 | Figgins | A01D 41/141 |
| 2018/0332768 A1 * | 11/2018 | Isaac | A01D 41/06 |
| 2021/0055099 A1 | 2/2021 | Walther et al. | |
| 2021/0137006 A1 | 5/2021 | Shearer et al. | |
| 2021/0185916 A1 | 6/2021 | Hunt | |
| 2022/0132740 A1 | 5/2022 | Hunt | |
| 2022/0354055 A1 | 11/2022 | Hermann | |
| 2023/0000015 A1 | 1/2023 | Hermann et al. | |
| 2023/0025352 A1 | 1/2023 | Hunt et al. | |

FOREIGN PATENT DOCUMENTS

| | | | | |
|---|---|---|---|---|
| CN | 112056087 A | * | 12/2020 | A01D 45/10 |
| CN | 117378353 A | * | 1/2024 | A01D 45/10 |
| DE | 2654141 A1 | | 6/1978 | |
| DE | 102016202628 A1 | | 8/2017 | |
| DE | 102016116808 A1 | | 3/2018 | |
| DE | 102017129193 A1 | * | 6/2019 | A01D 41/1273 |
| DE | 102019207984 A1 | * | 12/2020 | A01D 41/127 |
| EP | 2545761 B1 | | 1/2013 | |
| EP | 2681984 B1 | | 1/2014 | |
| EP | 3430881 A1 | * | 1/2019 | A01D 34/006 |
| EP | 2775818 B1 | | 8/2019 | |

OTHER PUBLICATIONS

Sensorlogic, Sensor Technology and Services, pp. 1-3 [online]; URL: <https://sensorlogic.ai/>.

"Conceptual Design of an Active Automatic Height Control System for Sugarcane Harvesting," University of Khartoum, Ibrahim M. Bushra Babiker Hijazi, et al., 67 pages, publicly available by Jul. 13, 2022.

"Basecutter sensor is 'like being on automatic pilot'", Nick Kennedy, Australian Canegrower, 2 pages, Sep. 7, 2009.

Page, Rayner Luke (2006) Ground detection sensor for cane harvester base-cutter height control. Masters (Research) thesis, James Cook University; http://eprints.jcu.edu.au/2123; pp. 119.

Sensorlogic, Sensor Technology and Services, pp. 1-3 [online]. Retrieved from internet <https://sensorlogic.ai/>.

* cited by examiner

RADAR BASED CUTTING HEIGHT SYSTEM FOR A SUGARCANE HARVESTER

FIELD OF THE DISCLOSURE

The present invention generally relates to a harvesting machine, and more particularly to a system and method for harvesting sugarcane with a sugarcane base cutter harvesting machine.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, have harvesting systems of various types. Harvesting systems for a sugarcane harvester, for example, include assemblies or devices for cutting, chopping, sorting, transporting, and otherwise gathering and processing sugarcane plants. Typical harvesting assemblies, in different embodiments, include a base cutter assembly (or "base cutter"), feed rollers, cutting drums, stalk collectors, and extractor fans etc.

To actively harvest crops, the sugarcane harvester gathers and processes material from rows of sugarcane plants. In the case of one type of sugarcane harvester, the gathered sugarcane stalks are cut into billets that move through a loading elevator to an elevator discharge, where the cut sugarcane stalks are discharged to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include rotating drums that move the cut stalks toward a chopper. The rotating drums are driven by a hydraulic motor or an electric motor that rotationally drives the roller to continuously move the billets to a fan for processing, and once processed, to a wagon or other container. The motors include splines that engage the roller to drive the roller about a rotation axis.

When harvesting sugarcane, it is generally desirable to cut the sugarcane crop at a location spaced above the ground. Under some conditions, productivity and quality losses occur when crop is cut at or below the ground surface. However, if the sugarcane is cut a location too far above the ground surface, some of the valuable crop can be lost.

In crop harvesting of sugarcane, it is desirable to cut the sugarcane at a consistent distance at each sugarcane stalk spaced with respect to the ground surface. The cutting tools, however, are obscured by the crop so visual feedback is limited. In the sugarcane crop, particularly since the stalk includes desirable material, cutting the stalk closer to the ground, but not too close to ingest soil, is preferred.

SUMMARY

What is needed therefore is a sugarcane harvester having a cutting system that efficiently and effectively cuts the sugarcane stalk at an optimized location to increase the amount of sugarcane crop for extracting sugar from the crop.

In one embodiment, there is provided a sugarcane harvester to cut sugarcane growing from a ground surface. The harvester includes a frame defining a front portion and a rear portion and a crop divider extending from the front portion of the frame. A cutting blade to cut sugarcane is supported by the frame and is located between the crop divider and the rear portion of the frame. A radar assembly is coupled to the frame and transmits electromagnetic waves toward the ground surface to identify a ground level, wherein the identified ground level is used to control the a height of the cutting blade with respect to the ground surface.

In some embodiments, the sugarcane harvester further includes a cutting blade support assembly coupled to the frame, wherein the cutting blade responds to movement of the cutting blade support assembly to adjust the height of the cutting blade with respect to the ground surface.

In some embodiments, the sugarcane harvester includes the cutting blade support assembly fixed with respect to the frame and the frame includes an adjustable height suspension adapted to adjust a height of the frame with respect to the ground surface. The adjustable height suspension adjusts the height of the frame to adjust the height of the cutting blade in response to the identified ground level.

In some embodiments, the sugarcane harvester includes the cutting blade support assembly which is adjustable with respect to the frame, wherein the cutting blade support assembly adjusts a height of the cutting blade with respect to the ground surface in response to the identified ground level.

In some embodiments, the radar assembly includes a transmit radar antenna and a receive radar antenna. The transmit radar antenna transmits a radar signal toward the ground surface and the receive radar antenna receives a reflected radar signal reflected from the ground surface to identify a range to the ground surface.

In some embodiments, the sugarcane harvester further includes a radar support assembly coupled to the frame, wherein the radar assembly is supported by the radar support assembly located between the crop divider and the cutting blade.

In some embodiments, the sugarcane harvester includes wherein the radar support assembly is located along a centerline of the sugarcane harvester.

In some embodiments, the sugarcane harvester includes wherein the radar assembly includes a forward looking radar system that identifies the ground level prior to the identified ground level reaching the cutting blade.

In some embodiments, the sugarcane harvester includes wherein the transmit radar antenna transmits electromagnetic waves that impinge an area larger than the area of the transmitted electromagnetic wave at the point of transmission from the radar assembly.

In some embodiments, the sugarcane harvester further includes a controller operatively connected to the radar assembly and to the cutting blade. The controller is adapted to receive the identified ground level identified by the radar assembly to adjust a position of the cutting blade with respect to the ground surface.

In some embodiments, the sugarcane harvester includes wherein the controller is operatively connected a ground speed device that identifies vehicle ground speed and which adjusts the position of the cutting blade based on the identified ground level and the identified ground speed.

In another embodiment, there is provided a method of harvesting sugarcane growing from a ground surface of a sugarcane field using a sugarcane harvester. The method includes: identifying a cutting height for harvesting the sugarcane from the sugarcane field, wherein the cutting height is a height determined with respect to the ground surface; determining, with a radar sensor, a distance between the ground surface and a cutting blade; comparing the identified cutting height to the determined distance between the ground surface and the cutting blade; adjusting the distance between the cutting blade and the ground surface based on the comparing step; and moving the sugarcane harvester through the sugarcane field to harvest the sugarcane at the adjusted distance of the cutting blade.

In some embodiments, the method includes wherein the moving step comprises moving the sugarcane harvester though the sugarcane field at an identified speed, and wherein the adjusting the distance between the ground surface and the cutting blade is based, in part, on the identified speed.

In some embodiments, the method includes wherein the identified speed is based on one or more of a harvester location provided by a GPS system, a ground speed of the harvester, or a state of a transmission of the harvester.

In some embodiments, the method includes wherein the one or more of a harvester location provided by a GPS system, the ground speed of the harvester, or the state of a transmission of the harvester identifies a trajectory of the sugarcane harvester through the field and a rate at which the height of the cutting head is adjusted.

In some embodiments, the method includes wherein the identifying a cutting height for harvesting the sugarcane from the sugarcane field is selectable through a user interface.

In some embodiments, the method includes wherein the user interface includes user controls to enable a user to adjust a target height for cutting the sugarcane at a location with respect to the ground surface.

In some embodiments, the method includes wherein the target height is determined with respect to the ground surface and includes the target height being below ground level, at ground level, or above ground level.

In a further embodiment, there is provided a system for cutting sugarcane with a sugarcane harvester. The system includes a cutting blade to cut sugarcane, wherein the cutting blade is supported by the sugarcane harvester. A radar assembly is coupled to the sugarcane harvester and transmits electromagnetic waves toward the ground surface. reflected electromagnetic waves identify a ground level used to adjust a height of the cutting blade with respect to the ground surface as the harvester cuts sugarcane.

In some embodiments, the system further includes a controller operatively connected to the radar assembly and to the cutting blade. The controller is adapted to receive the identified ground level and to adjust a position of the cutting blade with respect to the ground surface based on the identified ground level.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings.

DETAILED DESCRIPTION

Figure 1:
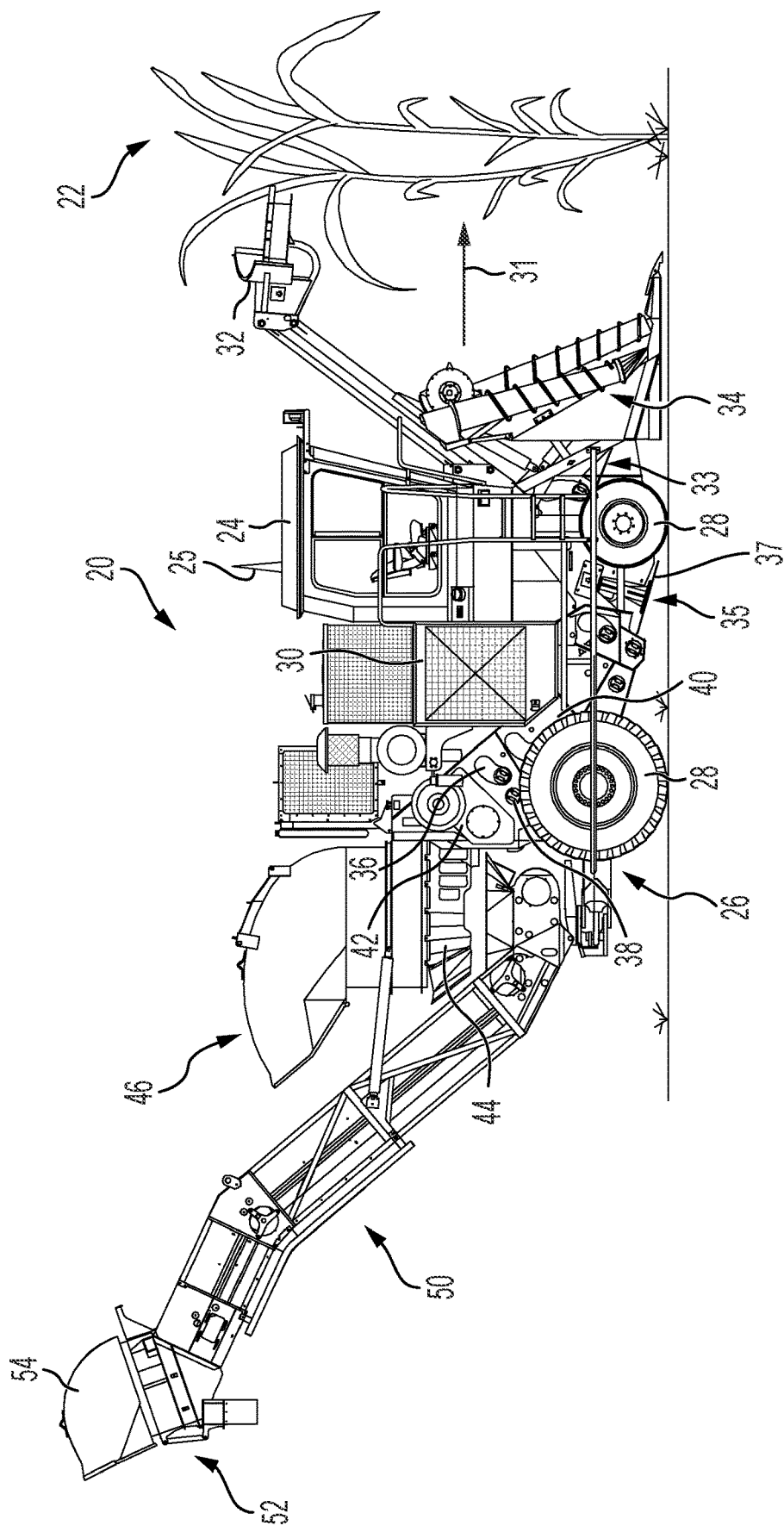
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 2:
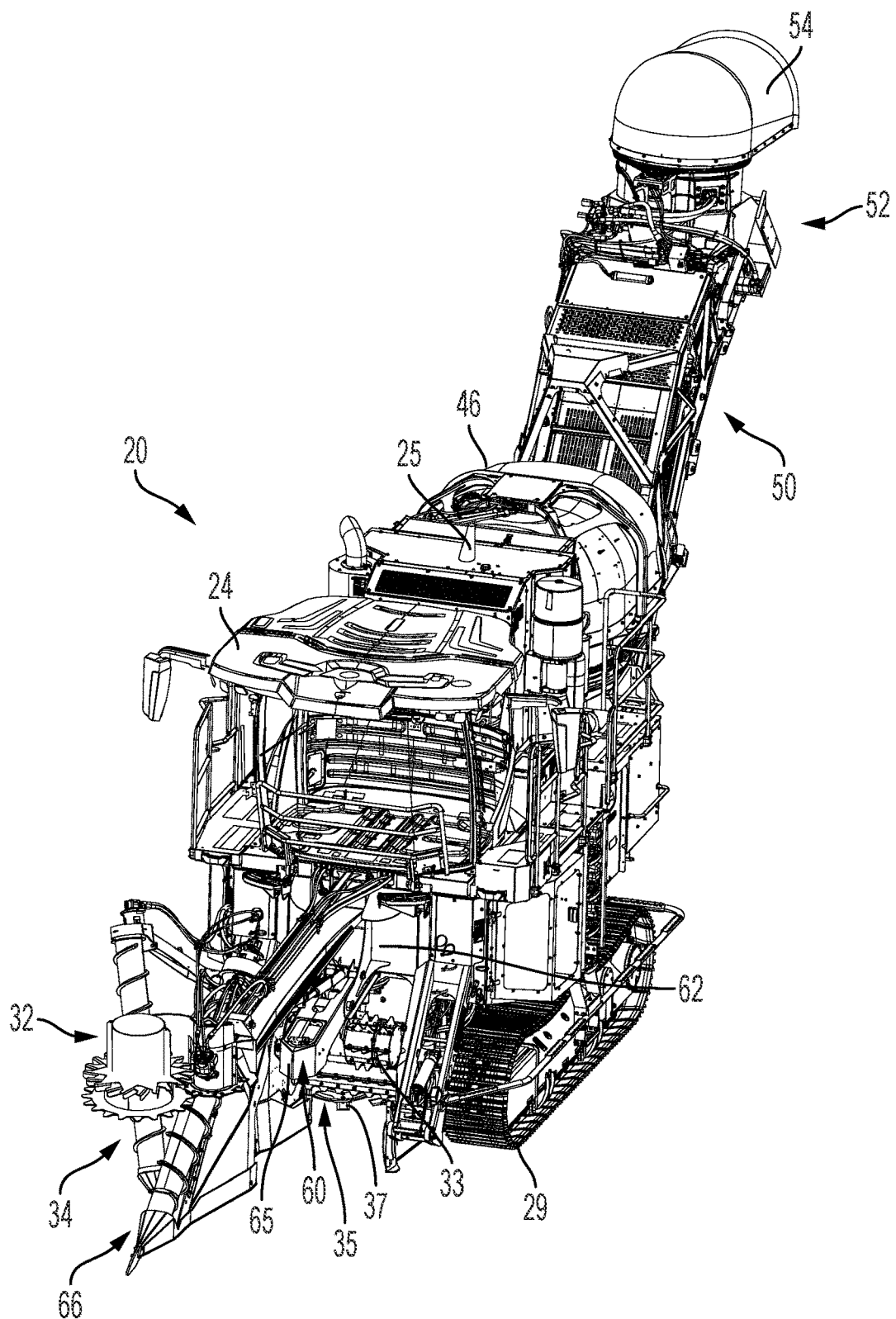
FIG. 2 illustrates a partial front perspective view of a sugarcane harvester.

FIG. 1 illustrates a side view of a sugarcane harvester 20 adapted to cut sugarcane 22, with the front of the harvester 20 facing to the right. Accordingly, certain components of the harvester may not be visible in FIG. 1. The harvester 20 includes a cab 24 located on a frame 26 that is supported by wheels 28, or tracks 29 as illustrated in FIG. 2. These ground engaging traction devices are configured to move the harvester along rows of sugarcane 22. The wheels 28 or tracks 29 are supported by an adjustable suspension, known by those skilled in the art, which adjusts the frame height with respect to the ground. A transmission, not shown, drives the wheels 28 or tracks 29, as is understood by one skilled in the art.

An antenna 25 is located on the cab 24. The antenna 25 is configured to receive and to transmit wireless signals to and from an externally located source of data information, such as is available over the web through a cloud system, or to and from a global positioning system (GPS) 27 (see FIG. 5) which is configured to transmit and/or receive location information of the harvester 20. In addition, the GPS system 27 is configured to transmit and/or receive machine control information to/from a harvester controller 104 of FIG. 5. In different embodiments, for instance, the GPS system 27 provides harvester status information including, but not limited to, harvester location, harvester ground speed, the current operating state of the transmission, and the height of a cutting blade with respect to the ground surface. In different embodiments, for instance, the GPS system 27 directs the harvester 20 through the field along a predetermined path to provide for harvesting. Other machine functions are contemplated. In some embodiments, the harvester 20 is a fully autonomous or semi-autonomous vehicle in response to harvester control signals transmitted by the GPS system.

An engine, located within a housing 30, drives the transmission that moves the wheels 28 or tracks 29, along a field to continually cut the sugarcane 22 for harvesting. In different embodiments, the engine also powers various driven components of the harvester 20. In certain embodiments, the engine directly powers one or more hydraulic pumps (not shown) and other driven components powered by the hydraulic motors via an embedded hydraulic system (not shown). In one or more embodiments, a ground speed is provided and identified by a ground speed device, including but not limited to, the GPS system, the transmission, wheel speed sensors, or track sensors. Other ground speed devices are contemplated, each of which identifies the speed of the harvester as it moves through the field.

A cane topper 32 extends forward of the frame 26, from a front portion thereof, in order to remove the leafy tops of sugarcane plants 22 as the frame 26 moves in a forward direction 31, to the right as illustrated. A set of crop dividers 34 guides the stalks of sugarcane toward internal mechanisms of the harvester 20 for processing.

As the harvester 20 moves across a field, sugarcane plants 22 passing between the crop dividers 34 are deflected downward by one or more knockdown rollers 33 before being cut near the base of the plants 22 by a base cutter assembly 35, as would be understood by one skilled in the art. Rotating cutter disks or blades 37, guides, or paddles on the base cutter assembly 35 further direct the cut ends of the plants rearward within the harvester 20 toward successive pairs of upper feed rollers 36 and lower feed rollers 38. The feed rollers 36 and 38 are supported by a feed roller chassis 40 which is supported by the main frame 26. The upper and lower feed rollers 36 and 38 convey the stalks toward a chopper drum module 42 for chopping the stalks into billets.

The chopper drum module 42 includes upper and lower chopper drums that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different embodiments, includes a fan assembly including a powered fan to clean the billets and to extract the crop residue, trash, and debris from the cleaning chamber 44. A loading elevator 50 extends from a rear portion of the frame 26 and has one end located at the bottom of the cleaning zone 44. The elevator 50 conveys the cleaned billets upward to a discharge location 52, below a secondary extractor 54, where the billets are discharged into a truck, a wagon, a container, or other receptacle that collects the discharged billets. The secondary extractor 54 separates the crop residue from the cut stalk to clean the cut stalk.

FIG. 2 illustrates a partial front perspective view of the harvester 20. As is understood by one skilled in the art, the cane topper 32 and the crop dividers 34, each include substantially identical and mirror imaged components that are located on either side of the sugarcane crop that is directed into the harvester 20 by the cane topper 32 and the crop dividers 34. In FIG. 2, the right side components of the cane topper 32 and crop dividers 34 are not shown to illustrate a portion of the base cutter assembly 35, including a single cutter 37 (cutting head), and the knockdown rollers 33. In addition, the harvester 20 includes a radar support structure 60 coupled to a frame member 62 of the harvester 20. See also FIG. 3.

Figure 3:
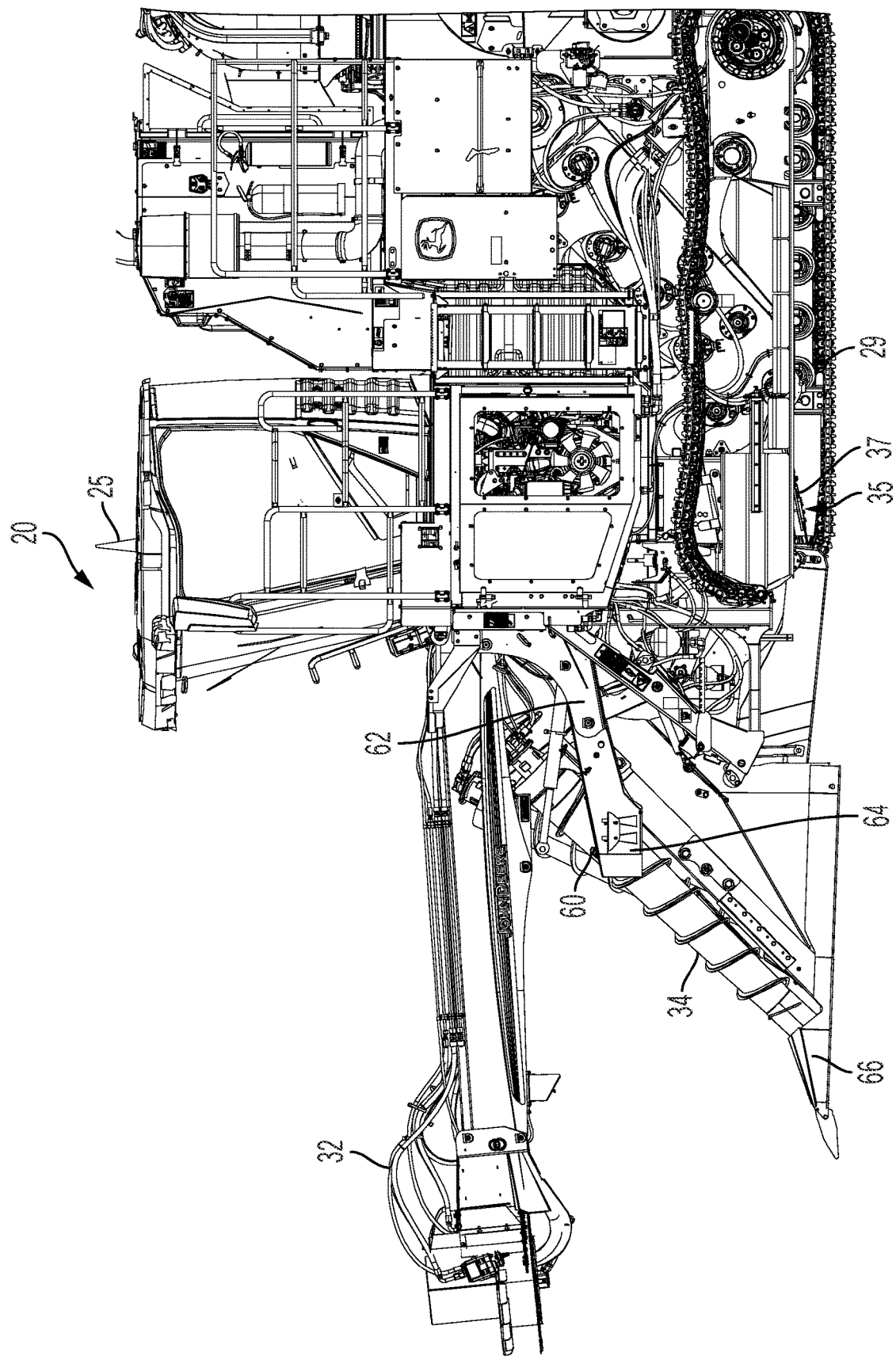
FIG. 3 illustrates a partial side view of a sugarcane harvester.
Figure 4:
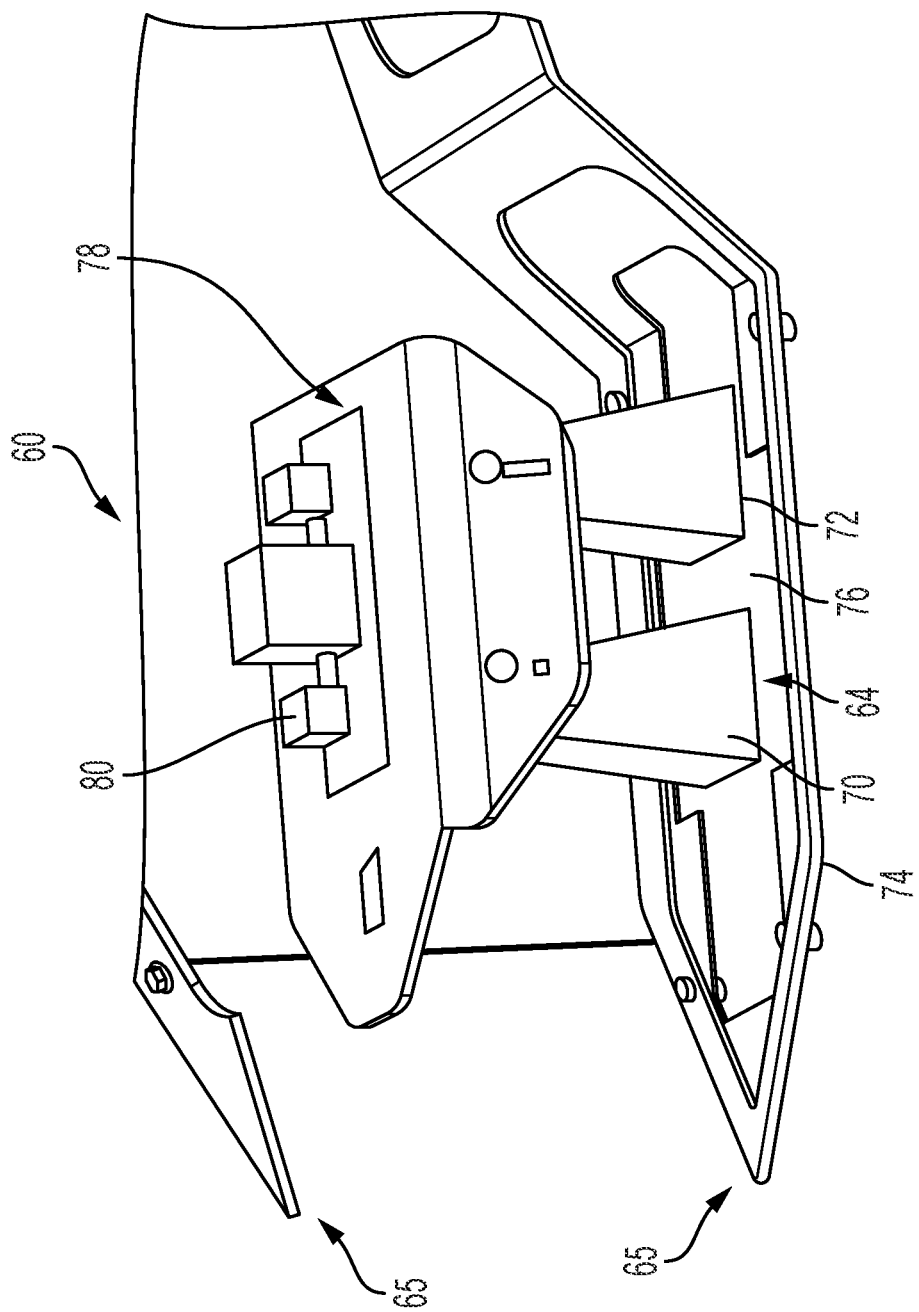
FIG. 4 illustrates a cutaway partial view of a radar sensor assembly.

The radar support structure 60 supports a radar sensor assembly 64 that is substantially centrally located along a centerline of the harvester 20 as it moves in a forward direction. As seen in FIG. 3, the radar sensor assembly 64 is located in a forward position, or in front of the cutter assembly 35, but behind a front portion 66 of the crop dividers 34. A front end 65 of the structure 60, as seen in FIG. 2 and FIG. 4, includes a leading bow having inclined sides extending from a single substantially vertical edge to direct debris away from the support 60. The radar sensor assembly 64 is used to identify a ground surface height with respect to and in front of the cutting blade 37 based on a sensed ground plane. The plane is established by a ground surface. By imaging the ground surface with radar signals transmitted by the radar assembly, a leading signal for a control system 100 is provided. The leading signal provides a forward looking sensing detection scheme to adjust the cutting height of the cutting blade in anticipation of changes in the ground plane as the vehicle 12 moves forward. In one embodiment, the radar sensor assembly 64 is fixed at a predetermined position with respect to the frame. In another embodiment, the position of the radar sensor assembly is adjustably moveable relative to the frame to be fixed at different locations. As long as the adjusted position is known and understood, the position of the sensor is known vs. the cutting blade and a distance of the blade to ground is determinable.

The radar sensor assembly 64, and the processing system to which the sensor is connected, provides a non-contacting radar based ground detection system. The ground detection system provides a mechanism to automate a cutting height of the sugarcane by adjusting the height of the cutter assembly 35 and the blades 37. Electromagnetic waves, i.e. signals, transmitted by the radar sensor assembly 64, penetrate obstructions between the sensor assembly and the ground surface, and provide an accurate determination of ground surface location with respect to the cutter assembly 35. The electromagnetic waves penetrate crop material, dust, water, fog, precipitation, any crop i.e., canopy, juice, residue, but not the ground. In addition, the radar sensor assembly 64 detects obstructions, such as rocks, located between the sensors and the ground. Electromagnetic waves include radio waves, microwaves, infrared waves, optical waves, ultraviolet waves, x-rays and gamma rays. As described herein, the radar assembly utilizes electromagnetic radio waves which are reflected from the ground and rocks, but which penetrate other materials thereby providing an accurate identification of a ground level of the ground.

A non-contact sensing radar system includes a controller to identify a distance between the base cutter 35 and the ground surface. In one or more embodiments, the sensing radar system utilizes electromagnetic waves, which includes in different embodiments, the use of different types of radar sensors, to measure the distance from the radar sensor assembly to the ground. Once the distance from the radar sensor assembly 64 to the ground is determined, the distance between the cutter assembly 35 and ground surface is determined. Using this determined distance, a cutting height of the cutter assembly 35 is set to a preferred height. While distance to ground is used in this application, radar systems, including radar receivers and transmitter often are described as including range to ground.

In one embodiment, the height of the cutting blade 37, and its cutting angle, i.e. 14 degrees, with respect to the vehicle frame, is fixed with respect to the frame of the harvester 20. To adjust the height of the cutting blade 37, the vehicle suspension includes an adjustable height suspension which moves up or down with respect to ground. Consequently, cutter position is adjusted by adjusting suspension height. In another embodiment, the cutting blade 37 is connected to a cutter support assembly which is independent of and adjustable with respect to the frame of the harvester. In this embodiment, the harvester suspension is not adjusted to adjust cutting blade 37 height, but the cutter support assembly moves with respect to the harvester frame to adjust cutting blade height.

FIG. 4 illustrates a cutaway partial view of the radar sensor assembly 64 including a first radar horn antenna 70 and a second radar horn antenna 72, each of which is located next to a bottom portion of the radar support structure 74. In one embodiment, each of the first and second horn antennas 70 and 72 is supported above or are in contact with a planar sheet 76, i.e. radome, made of radar transparent material. In one or more embodiments, the radar transparent material includes, but is not limited to, a polycarbonate material such as Lexan, plastic, or glass. The use of the polycarbonate material enables the transmission and reception of the electromagnetic waves, while providing protection from debris that can move toward the radar sensor assembly 64 during harvesting.

Each of the first and second horn antennas 70 and 72 is spaced apart and held in position by an upper support structure 78, that further supports an electrical circuit 80 coupled to the horn antennas 70 and 72. In one embodiment one of the first and second horn antennas is a transmit antenna, i.e. transmitter, and the other of the first and second horn antennas is a receive antenna, i.e. receiver. As the harvester 20 moves in a forward direction when cutting sugarcane, the transmit antenna transmits electromagnet waves from the radar sensor assembly 64 toward the ground and the receive antenna receives reflected electromagnetic waves reflected from the ground in response to the transmitted electromagnetic waves. Due to the nature of the transmitted electromagnetic waves, the area at ground level being sensed, i.e. impinged by the transmitted waves, is larger than the area of the transmitted electromagnetic wave at the point of transmission from the transmit horn antenna. By sensing a larger area at ground level, the radar system is forward looking such that the ground level at the cutting blade 37 is determined prior to it reaching the cutting blade 37. In one embodiment, the sensors 70 and 72 have a range of frequency from 900 MHz to 24 GHz. In another embodiment, the center frequency of the transmitted waves is 7 GHz. Adjustable center frequencies are also contemplated. In one embodiment, the radar antenna is a synthetic aperture radar (SAR) array. In other embodiments, the radar sensor includes different shaped horns or oscillating horns. The distance between the receive radar antenna and transmit radar antenna is based on the capabilities of different radar systems is variable and includes distances of from millimeters to meters.

The radar sensor assembly 64 provides a non-contact sensing system to measure the distance to the ground surface for a crop harvester. In one embodiment, the distance of the ground surface from the radar sensor assembly 64 is based on a period of elapsed time between transmission of the radar signal from one of the horn antennas to receipt of the reflected radar sensor at the other horn antenna. In another embodiment, the distance to the ground surface is based on a phase shift between the transmitted signal and the received signal.

The sensing system utilizes electromagnetic waves to measure the distance from the radar sensor 64 to the ground. By identifying the distance from the radar sensor 64 to ground, the location of the base cutter 35 with respect to ground is identified.

Figure 5:
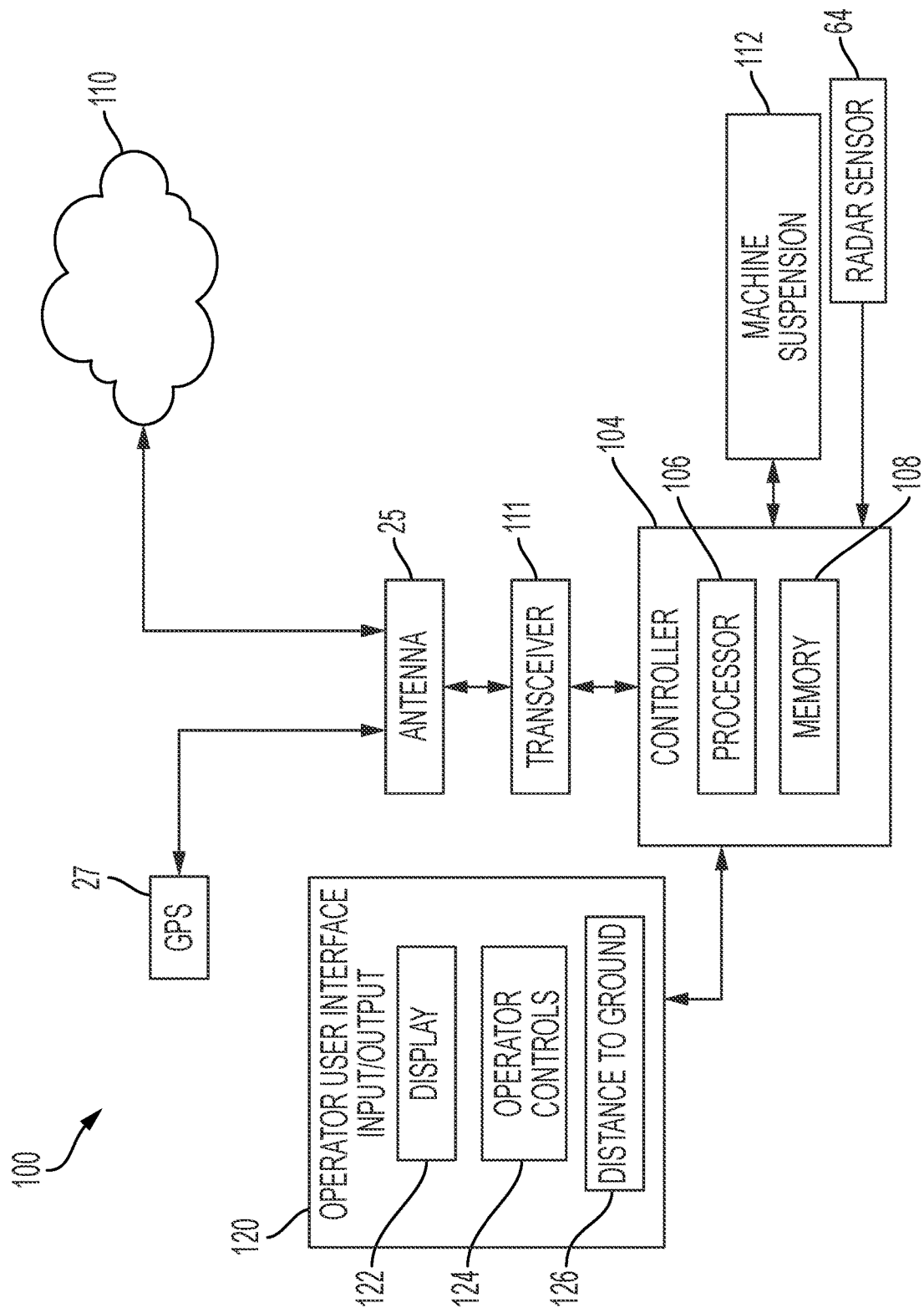
FIG. 5 illustrates a schematic block diagram of a control system for a harvester.

FIG. 5 illustrates a schematic block diagram of a control system 100 configured to determine a cutting height of the sugarcane when harvested. The control system 100 includes one or more electronic controllers 104, also known as an electronic control unit (ECU), each of which is connected to a controller area network (CAN) bus (not shown) of the harvester 20 and to the various devices, systems, parts, or components of the harvester 20. The CAN bus is configured to transmit electric signals for the control of various devices connected to the bus, as well as to determine status signals that identify the status of the connected devices.

The controller 104, in different embodiments, includes a computer, computer system, or other programmable devices. In these and other embodiments, the controller 104 includes one or more processors 106 (e.g. microprocessors), and an associated memory 108, which can be internal to the processor or external to the processor. The memory 108 includes, in different embodiments, random access memory (RAM) devices comprising the memory storage of the controller 104, as well as any other types of memory, e.g., cache memories, non-volatile or backup memories, programmable memories, or flash memories, and read-only memories. In addition, the memory, in different embodiments, includes a memory storage physically located elsewhere from the processing devices, and can include any cache memory in a processing device, as well as any storage capacity used as a virtual memory, e.g., as stored on a mass storage device or another computer coupled to controller 104. The mass storage device can include a cache or other dataspace which can include databases. Memory storage, in other embodiments, is located in a cloud system 110, also known as the "cloud", where the memory is located in the cloud at a distant location from the machine to provide the stored information wirelessly to the controller 104 through the antenna 25 operatively connected to a transceiver 111, which is operatively connected to the controller 104. When referring to the controller 104, the processor 106, and the memory 108, other types of controllers, processors, and memory are contemplated. Use of the cloud 110 for storing data, in one embodiment, leads to storage economies of scale at a centrally located operation's center, where data from a large number of harvesters is stored. In other embodiments, data from other types of work machines is stored.

The controller 104 executes or otherwise relies upon computer software applications, components, programs, objects, modules, or data structures, etc. Software routines resident in the included memory 108 of the controller 104, or other memory, are executed in response to the signals received from the radar sensor assembly 64 which is located on, at or within the harvester as described herein. The controller 104 also receives signals from other controllers such as an engine controller and a transmission controller. The controller 104, in other embodiments, also relies on one or more computer software applications that are located in the "cloud" 110, where the cloud generally refers to a network storing data and/or computer software programs accessed remotely, such as local cloud functionality not connected to the internet, or mesh networking among machines. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

An operator user interface 120 is operatively connected to the controller 104 and is located in the cab 24 to display machine information to an operator or user, as well as to enable the user to control operations of the harvester 20. The user interface 120 includes a display 122 to display status information directed to the condition or status of the harvester 20. Status information includes, but is not limited to, the operating status of a machine suspension 112 as well as the signals transmitted and received by the radar sensor 64. The user interface 120 further includes operator controls 124 configured to enable the user to control the various functions and features of the machine suspension 112, or other machine operating systems. A distance to ground user interface 126 is located at the user interface 120 and provides one or more functions. Such functions include, but are not limited to, a display of a current distance between the ground and the cutter 37 of the base cutter assembly 35. In some embodiments, the user interface 126 includes one or more operator controls which are configured to manually adjust the distance between the cutter 37 and the ground.

Other work machines, known as autonomous machines, are controlled remotely without operator or user intervention at the machine itself. In such a system, a remote control system is used to remotely control operation of the harvester 20 through web-based communication tools and platforms with the cloud 110, as is understood by those skilled in the art. In one embodiment, an operator, user, or manager is located at a remote control system, which due to its cloud communication protocol, is located remotely from the harvester 20. In such an embodiment, the control system 100 is a distributed control system having components located at one or more of the work machines, the cloud, and the remote control system.

Figure 6:
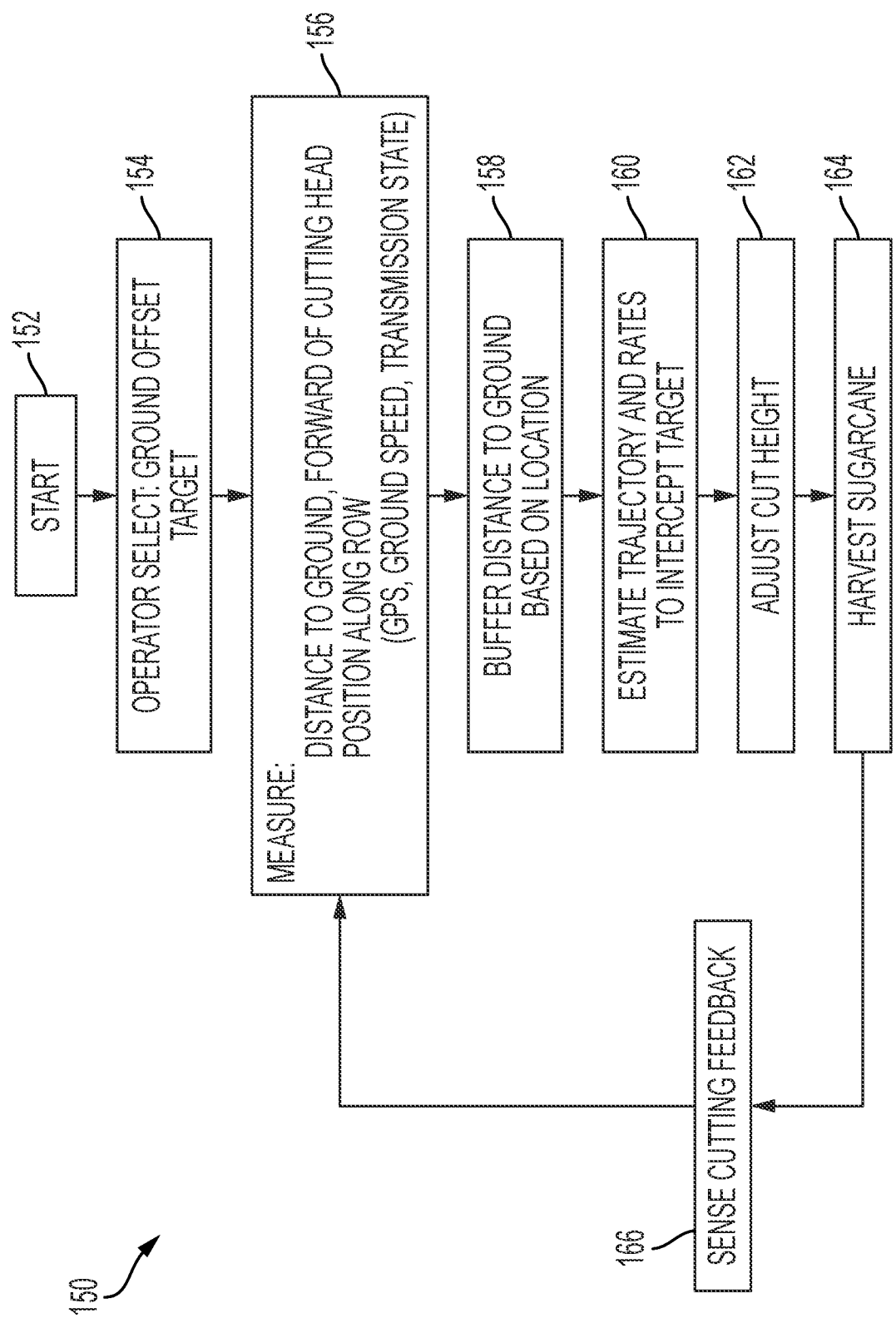
FIG. 6 illustrates a block diagram of a process for a radar based cutting height system for the sugarcane harvester.

FIG. 6 illustrates a block diagram of a process 150 of the radar based cutting height system for the sugarcane harvester. The process 150 begins at start block 152 after which the user selects a cutting height to establish a ground offset target at block 154. The ground offset target establishes a cutting height of the cutting blade 37 with respect to the ground surface. The selectable cutter height is determined by the user, or another individual, based on the type or condition of soil in which the sugarcane is planted or based on a cutting height determined by user experience. Once the user determines a preferred height, the user sets a target height through the operator controls 124, which enable the user to scroll up or down to set the target height, in one embodiment. In other embodiments, the user selects the height using the controls 124 that display a number of predetermined height selections that are selectable though predefined buttons.

Depending on the location in which the sugarcane is grown, the desired height is selected based on the location of the sugarcane being harvested. For instance, in one location, the cutting height is set to one inch above ground. In another locations, the cutting height is set one inch below ground. In both cases, the radar sensor assembly 64 identifies a ground surface and the machine adjusts the cutter height accordingly based on the selected height. In another location, such as Australia, the cutter height is adjusted to a minus one inch, i.e. one inch below ground level.

Once the height is selected at block 154, also known as a ground offset target, the controller 104 determines the distance to ground using the radar sensor assembly 64. In one embodiment, this initial distance to ground is determined in front of the cutting blade 37, but behind the front portion 66 of the crop dividers 34. In other embodiments, the sensor assembly 64 is located before the crop dividers 34, such as attaching the sensor assembly 64 to the topper 32. The initial distance to ground is determined by the actual distance of the cutting blade 37 with respect to ground, which is then adjusted during a harvesting operation taking into account one or more of: 1) the selected height identified by the operator, 2) a location of the harvester 20, 3) an expected ground speed, and 4) an operating state of the transmission. One or more of these elements is used to determine, at block 158, a buffer distance to ground height value is based on a location of the harvester 20 within a field is determined. The determined value, which is updated on a continuing basis, controls and adjusts the distance of the blade 37 to the ground surface as the vehicle travels through the field.

The controller 104 at block 158 measures the distance to ground and buffers, or stores, the height value, i.e, data, in memory based upon the distance from the measured value to the cutter(s) along the row. For example, as the machine moves along the row, the controller receiving signals from the sensor assembly 64, identifies the distance to ground and stores that distance as first element in a series of elements, representing a distance that is zero meters along the row. In one embodiment, the machine moves forward by one meter along the row as measured by the propulsion system of the GPS system. The distance to ground at the one meter location is then measured and stored as a second element in the series of elements. The second element represents the distance to ground one meter further down the length of the row. This process is repeated by continually updating the second element one meter further along the row. As the machine reaches a further distance along the row (the one meter distance in this embodiment), the machine knows how far the sensor is in front of cutting blades. Based on this identified distance, the machine identifies where the ground is as the machine moves forward along the row and adjusts the position of the cutting blades as necessary. While the one meter distance is used in this embodiment, other distances are contemplated.

Once the location of the harvester 20, the expected ground speed, and/or the state of the transmission is identified, the trajectory of the harvester is estimated and is used by the controller 100 to automatically adjust the height of the blade 37 with respect to the ground surface at block 160. The controller 100, using this information, identifies or estimates the trajectory or path of the harvester and the rate or time period at which the target, i.e. sugarcane cutting height, it to be reached by the cutting blade 37. For instance, if the terrain of the field is relatively level, the speed of the harvester may be greater than the speed of the harvester if the terrain is more uneven or hillier. The controller 160 adjusts height of the blade 37 continuously as the vehicle moves through a field. The rate of adjustment of the height of the blade 37 is determined by the controller based, in part, on the speed of the vehicle. By continuously adjusting the blade height, large variations in cutting height of the sugarcane stalks are avoided. By doing so, more sugarcane stalk is harvested which increases productivity. For a relatively level field, adjustments of blade height typically occur less often. If, however, the terrain is more hilly, the blade height may be adjusted more rapidly when compared to traveling a relatively level field. Using this information, the controller 104 adjusts blade height, or cut height, at block 162. As the vehicle continues to move through the field, the sugarcane is harvested at block 164 while maintaining a relatively consistent cutting height at which the sugarcane is harvested. The system, in at least one embodiment, includes a predefinable or runtime configurable setting, for a target offset from the ground. In one or more embodiments, the system begins with a default cut height. In this or other embodiments, the value of the cut height is adjustable during operation The relatively consistent cutting height is maintained by the controller 104 by constantly monitoring blade height as determined by the controller 104 at block 166. In other embodiments, monitoring of blade height with respect to ground occurs at discrete periods of time, such as every five seconds. If the cutting height changes, the controller 104 adjusts the height of the machine suspension to maintain the selected ground offset target at block 154. In one embodiment, the controller 104, using the ground speed of the harvester 20, identifies a time of flight (TOF) between the radar sensed ground plane and the cutting blade, to adjust the blade height. In one embodiment, the ground speed is used to determine the distance along a row to buffer data spatially, rather than temporally. In another embodiment, the controller 104 receives status signals from a motor driving the cutting blades 37. If motor pressure increases, the controller 104 determines that the cutting blade height is too low, which is raised to reduce the motor pressure. Response time of suspension adjustment is also used by the controller 104 is used to determine where and/or when the cutting blade(s) reach the targeted ground height. As the machine is moving along the row and the machine suspension is being adjusted, a vector of motion is determined for the forward motion of the basecutter blades. This vector of motion is used by the controller to determine when the blades intersect the cutting height at the ground in front.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A sugarcane harvester to cut sugarcane growing from a ground surface, the harvester comprising:
 a frame defining a front portion and a rear portion;
 a crop divider extending from the front portion of the frame;
 a cutting blade to cut sugarcane, the cutting blade supported by the frame and located between the crop divider and the rear portion of the frame;
 a radar assembly coupled to the frame, the radar assembly transmitting electromagnetic waves toward the ground surface to identify a ground level of an area of the ground surface in front of the sugarcane harvester, wherein, in response to identification of the ground level based on information obtained by the radar assembly, a height of the cutting blade is adjusted.

2. The sugarcane harvester of claim 1 further comprising:
 a cutting blade support assembly coupled to the frame, wherein the cutting blade responds to movement of the cutting blade support assembly to adjust the height of the cutting blade with respect to the ground surface.

3. The sugarcane harvester of claim 2 wherein the cutting blade support assembly is fixed with respect to the frame and the frame includes an adjustable height suspension adapted to adjust a height of the frame with respect to the ground surface, wherein adjustable height suspension adjusts the height of the frame to adjust the height of the cutting blade in response to the identified ground level.

4. The sugarcane harvester of claim 2 wherein the cutting blade support assembly is adjustable with respect to the frame, wherein the cutting blade support assembly adjusts a height of the cutting blade with respect to the ground surface in response to the identified ground level.

5. The sugarcane harvester of claim 2 wherein the radar assembly includes a transmit radar antenna and a receive radar antenna, wherein the transmit radar antenna transmits a radar signal toward the ground surface and the receive radar antenna receives a reflected radar signal reflected from the ground surface to identify the ground level of the ground surface.

6. The sugarcane harvester of claim 5 further comprising a radar support assembly supporting the radar assembly, wherein the radar support assembly is located at one of the cane topper or between the crop divider and the cutting blade.

7. The sugarcane harvester of claim 6 wherein the radar support assembly is located along a centerline of the sugarcane harvester.

8. The sugarcane harvester of claim 6 wherein the radar assembly is a non-contact, forward looking radar system that identifies the ground level prior to the identified ground level reaching the cutting blade.

9. The sugarcane harvester of claim 8 wherein the transmit radar antenna transmits electromagnetic waves that impinge an area larger than the area of the transmitted electromagnetic wave at the point of transmission from the radar assembly.

10. The sugarcane harvester of claim 1 further comprising a controller operatively connected to the radar assembly and to the cutting blade, the controller adapted to receive the identified ground level identified by the radar assembly to adjust a position of the cutting blade with respect to the ground surface.

11. The sugarcane harvester of claim 10 wherein the controller is operatively connected a ground speed device that identifies vehicle ground speed and which adjusts the position of the cutting blade based on the identified ground level and the identified ground speed.

12. A method of harvesting sugarcane growing from a ground surface of a sugarcane field using a sugarcane harvester, the method comprising:
 identifying a cutting height for harvesting the sugarcane from the sugarcane field, wherein the cutting height is a height determined with respect to the ground surface;
 determining, with a radar sensor, a distance between a ground level of an area of the ground surface at a location ahead of the sugarcane harvester and a cutting blade;
 comparing the identified cutting height to the determined distance between the ground level of the area of the ground surface and the cutting blade;
 adjusting the distance between the cutting blade and the ground level of the area of the ground surface based on the comparing step; and
 moving the sugarcane harvester through the sugarcane field to harvest the sugarcane at the adjusted distance of the cutting blade.

13. The method of claim 12 wherein the moving step comprises moving the sugarcane harvester though the sugarcane field at an identified speed, and wherein the adjusting the distance between the ground surface and the cutting blade is based, in part, on the identified speed.

14. The method of claim 13 wherein the identified speed is based on one or more of a harvester location provided by a GPS system, a ground speed of the harvester, or a state of a transmission of the harvester.

15. The method of claim 14 wherein the one or more of a harvester location provided by a GPS system, the ground speed of the harvester, or the state of a transmission of the harvester identifies a trajectory of the sugarcane harvester through the field and a rate at which the height of the cutting head is adjusted.

16. The method of claim 15 wherein the identifying a cutting height for harvesting the sugarcane from the sugarcane field is selectable through a user interface.

17. The method of claim 16 wherein the user interface includes user controls to enable a user to adjust a target height for cutting the sugarcane at a location with respect to the ground surface.

18. The method of claim 17 wherein the target height is determined with respect to the ground surface and includes the target height being below ground level, at ground level, or above ground level.

19. A system for cutting sugarcane with a sugarcane harvester, the system comprising:
- a cutting blade to cut sugarcane, the cutting blade supported by the sugarcane harvester;
- a radar assembly coupled to the sugarcane harvester, the radar assembly transmitting electromagnetic waves toward an area of the ground surface in front of the sugarcane harvester, wherein reflected electromagnetic waves identify a ground level used to adjust a height of the cutting blade with respect to the ground surface as the harvester cuts sugarcane.

20. The system of claim 19 further comprising a controller operatively connected to the radar assembly and to the cutting blade, wherein the controller is adapted to receive the identified ground level and to adjust a position of the cutting blade with respect to the area of the ground surface based on the identified ground level.

\* \* \* \* \*